W. F. WARBURTON.
Improvement in Tobacco-Pipes.
No. 114,997.　　　　　　　　　　　Patented May 16, 1871.
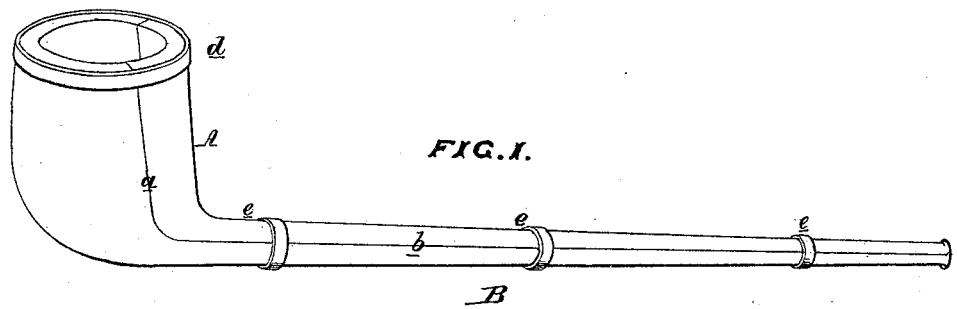
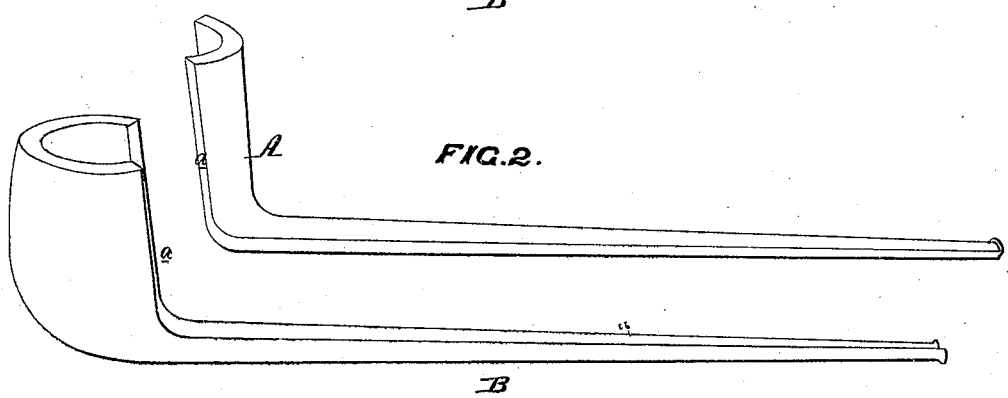
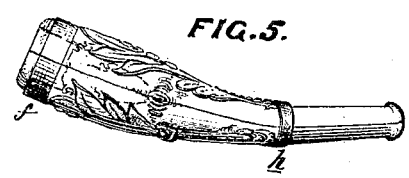
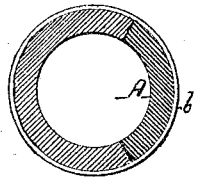
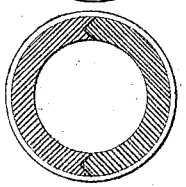
Witnesses: Wm A Steel, Thos M Sloan
W. F. Warburton
by his atty
Howson and Son

United States Patent Office.

WILLIAM FRANCIS WARBURTON, OF PHILADELPHIA, PENNSYLVANIA.

Letters Patent No. 114,997, dated May 16, 1871.

IMPROVEMENT IN TOBACCO-PIPES.

The Schedule referred to in these Letters Patent and making part of the same.

I, WILLIAM FRANCIS WARBURTON, of Philadelphia, county of Philadelphia, State of Pennsylvania, have invented an Improvement in Tobacco-Pipes, Pipe-Stems, and Cigar-Holders, of which the following is a specification.

Nature and Object of the Invention.

My invention relates to a tobacco-pipe or cigar-holder, or the stem of a pipe made in two parts, bound together and separable from each other; and My invention consists in constructing the said parts, as described hereafter, so as to afford facilities for readily cleaning them without presenting joints, between which fluid can escape from the stem of the holder or stem or bowl of the pipe.

Description of the Accompanying Drawing.

Figure 1 is an exterior view of my improved tobacco-pipe as it appears when the two parts are fitted together;

Figure 2, the pipe as it appears when the two parts are detached from each other;

Figure 3 shows a pipe-stem made according to my invention;

Figure 4, a view of the end ferrule for the said stem;

Figure 5, a view of a cigar-holder made according to my invention;

Figure 6, a transverse section of the stem of the pipe or cigar-holder drawn to an enlarged scale; and Figures 7 and 8, sections of the bowl of the pipe or cigar-holder.

General Description.

In figs. 1 and 2—

A represents the bowl, and

B the stem of a pipe, which may be made of wood, clay, hard rubber, or other materials of which tobacco-pipes have heretofore been made.

The pipe is made in two parts, separable from each other, the bowl being divided on the line *a*, fig. 1, and the stem on the line *b*, which meets the line *a* at the bowl, so that the halves may be detached from each other, as shown in fig. 2.

After being fitted together the two parts may be bound to each other at the bowl by a ring, *d*, and at the stem by any suitable number of hoops or ferrules, *e e*.

The joint of the bowl may be made in the manner shown in fig. 7; or one portion of the bowl may have V-shaped ribs adapted to V-shaped grooves in the other portion, as shown in fig. 8. I prefer to make the stem, however, in the manner illustrated in fig. 6, a V-shaped groove being formed in one portion of the stem for receiving a similarly-shaped strip, *x*, forming the other portion of the stem, the sharp angular edge of the strip *x* being cut away, so that, when it is fitted in its place, there shall be a longitudinal channel for the passage of the smoke from the bowl to the mouth of the smoker.

The same remarks will apply to the cigar-holder, fig. 3, the halves of which are fitted together in the manner described, and bound together by the hoops *f* and *h*.

On removing the binding-rings the two portions of the pipe can be separated, and the interior of both bowl and stem thoroughly washed and otherwise cleansed. In like manner the cigar-holder, fig. 5, may be taken apart, cleansed, and the parts fitted together again.

Hitherto sectional pipes have been divided vertically into halves of the same form, or horizontally on a line corresponding to the line *b*, fig. 1, when continued through the bowl. In either case there is a joint at the bottom of the bowl, which, if not perfectly tight, will permit offensive fluid to pass from the bowl and stem to the outside of the pipe, and, however neatly the parts may be fitted in the first instance, the wood, under the influence of heat and moisture, will soon warp to such an extent as to open the joint.

It will be seen that, when divided along the line *a b*, as described, the escape of fluid is prevented, even should the joint not be perfectly closed, and that, owing to the manner in which the pipe is divided, the edges of the sections may be beveled or inclined, so as to insure a perfect joint under almost all circumstances.

By forming the sections of the stem of the pipe or holder as shown in fig. 6 a channel is provided through which the fluid can flow without passing to the outside of the pipe, even if the upper section is removed.

As the bowl of a tobacco-pipe can be much more easily cleansed than the stem, the former may be in one piece, and the stem only made to take apart in a manner which will be readily understood by reference to fig. 3.

Claims.

1. A sectional pipe, divided on the line *a b*, as and for the purpose described.

2. The stem or holder made in two parts, the lower of which has a V-shaped channel adapted for the reception of the upper section, as specified.

In testimony whereof I have signed my name to this specification in the presence of two subscribing witnesses.

WM. F. WARBURTON.

Witnesses:
WM. A. STEEL,
F. B. RICHARDS.